March 23, 1965

C. T. HARDWICK 3,175,126

METHOD OF AND APPARATUS FOR REPLACING
ELECTRICAL RELAY MECHANISM

Filed June 5, 1961

INVENTOR.
C.T. HARDWICK

BY *Hudson & Young*

ATTORNEYS

3,175,126
METHOD OF AND APPARATUS FOR REPLACING ELECTRICAL RELAY MECHANISM

Charles T. Hardwick, Bartlesville, Okla., assignor to Phillips Petroleum Company, a corporation of Delaware
Filed June 5, 1961, Ser. No. 114,775
2 Claims. (Cl. 317—99)

This invention relates to an improved method of and apparatus for replacing an electrical relay mechanism. In the replacement, by conventional methods, of defective circuit breakers, starters, and relays, hereinafter broadly referred to as relay mechanisms, positioned in operating electrical circuits, it is generally required that the replacement be performed by one skilled in the art. This is necessary in order that the replacement can be effected safely and, where down time of the electrical circuit is critical, in the shortest period of time. However, even with the instant availability of one skilled in the art, the electrical circuit is non-operational during the time required to replace the defective relay mechanism.

Accordingly, an object of this invention is to provide an improved method of and apparatus for replacing electrical relay mechanisms.

Another object of this invention is to provide an improved method of and apparatus for the replacement of relay mechanisms so that electrical circuits containing said relay mechanisms are inoperative for a minimum period of time.

Another object of this invention is to provide an improved method of and apparatus for replacing electrical relay mechanisms whereby said replacement can be safely made by one normally unskilled in the art of replacing said relay mechanisms.

Other objects, advantages and features of my invention will be readily apparent to those skilled in the art from the following description and appended claims.

I have discovered an improved method of placing relay mechanisms in an electrical circuit whereby all of said relay mechanisms are so positioned that said relay mechanisms can be simultaneously removed and replaced.

Figure 1:
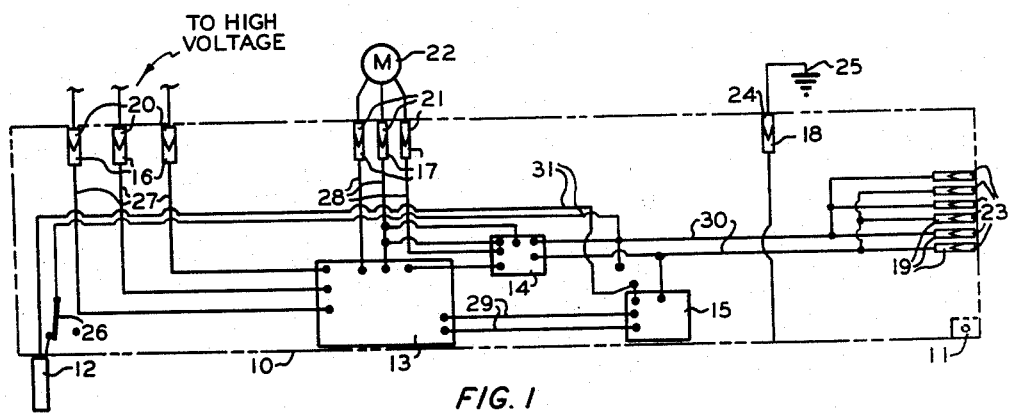
FIGURE 1 is a schematic representation of one embodiment of the inventive method of and apparatus for replacing relay mechanisms in an electrical circuit.

Referring to FIGURE 1, there is shown a means of mounting electrical relay mechanisms such as a panel or other supporting member 10 pivoted by a handle 12 about pivot means 11. A circuit breaker 13 and electrical relays 14 and 15 are mounted upon panel 10. Friction electrical contact members 16, 17, 18, and 19 are also mounted upon panel 10. As shown, panel 10 is in a closed position. This is to say that a high voltage current transmitted to contact members 20, complementary contact members of contact members 16, is transmitted via contact members 16, lines 27, electrical circuit breaker 13, lines 29, electrical relay 15, lines 31, lines 30, electrical relay 14, lines 28 and friction electrical contact members 17 to friction electrical contact members 21 and electric motor 22. A high voltage current is passed to contact members 20, transformed to a lower voltage current and transmitted via contact members 16, lines 27, circuit breaker 13, lines 29, electrical relay 15, lines 31, lines 30 and friction electrical contact members 19 to friction electrical contact members 23. Panel 10 is grounded by means of contact members 18, contact member 24 and ground means 25. Contact members 16, 17, 18, 19, 20, 21, 23 and 24 can be any means of establishing electrical connections by frictional contact.

Contact members 20, 21, 23, and 24 are each mounted in a fixed and immovable position. Therefore, when panel 10 is pivoted away from contact members 20, 21, 23 and 24, the flow of high voltage current from contact members 20 is automatically broken. Preferably, for reasons of safety, contact between contact members 16 and 20 is the first to be broken upon pivoting panel 10, and contact between contact members 18 and 24 is the last to be broken upon pivoting panel 10 to an open position. Switch member 26 is normally in a closed position, permitting the flow of current from circuit breaker 15 to electrical relay 14 and contact members 19. When handle 12 is grasped and rotated preparatory to pivoting panel 10 to an open position, switch 26 is pivoted to an open position, thereby breaking the flow of electrical current to motor 22 and contact members 23. Switch 26 is a conventional means of breaking the flow of an electrical current such as a V3 switch illustrated on page 11 of catalog 101 distributed by Micro Switch, a division of Minneapolis-Honeywell Regulator Co. Upon pivoting panel 10 to an open position, contact between contact members 16 and 20 is the first to be broken, followed by the breaking of contact between contact members 17 and 21, contact between contact members 19 and 23, and finally breaking contact between contact members 18 and 24.

When panel 10 is in a closed position and motor 22 is operating, current flows from a high voltage source through contact members 20 and 16 to circuit breaker 13, from circuit breaker 13 through contact members 17 and 21 to motor 22. Current also flows from circuit breaker 13 to relay 15. Current flowing from relay 15 through switch 26 to relay 14 and thus to contact members 17 maintains the flow of current to motor 22. An electrical current also flows from relay 15 to contact members 19. The current flowing through lines 27, 28, 29, and 30 can be used in circuit breakers, and in the operation of relays to either start or stop electrically operated equipment. Said current can also be used to operate electric light signals.

To replace all of the relay mechanisms mounted upon panel 10, it is only necessary to pivot panel 10 to an open position, raise panel 10 from its hinges 11, replace panel 10 with a substittue panel having relay mechanisms mounted thereon as on panel 10, and pivot the substitute panel into a closed position. In this manner, defective circuit breakers, starters, relays or other attached equipment can be replaced in the minimum of time by one normally considered to be unskilled in the art of replacing said relay mechanisms.

It is within the scope of this invention to employ other means of placing panel 10 in a closed position other than by pivoting said panel 10. For example, guide rails can be employed whereby panel 10 is rolled or slid into a closed position, and by reversing the direction of movement, returned to an open position. It is, of course, within the scope of this invention to increase the number of relay mechanisms or reduce the number of relay mechanisms mounted upon panel 10.

Figure 2:
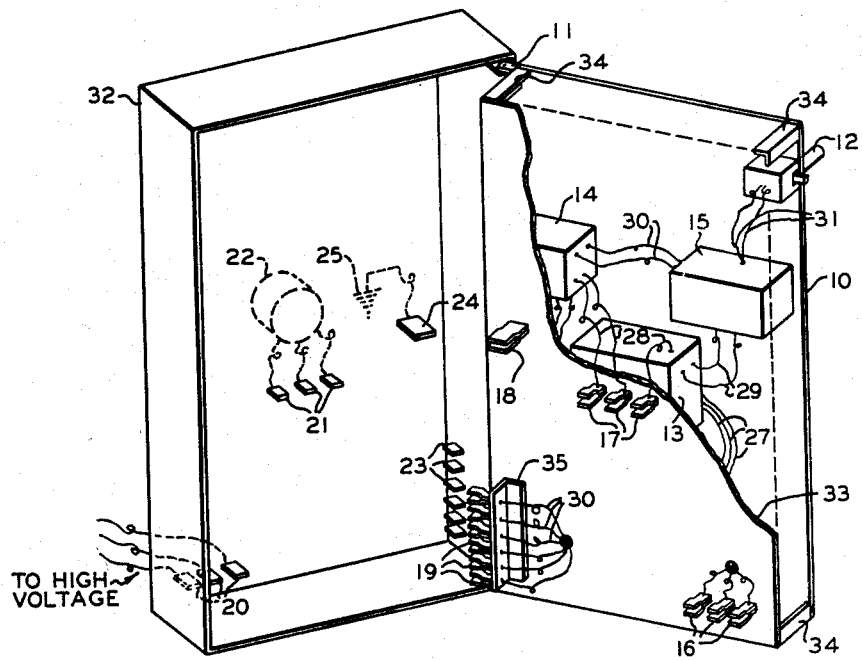
FIGURE 2 illustrates a method of and apparatus for mounting the relay mechanisms of FIGURE 1.

Referring to FIGURE 2, there is illustrated a method of and apparatus for replacing the electrical relay mechanisms of FIGURE 1 in the inventive manner.

A rectangular-shaped casing 32 having three enclosed sides and an open fourth side is illustrated. Casing 32 can be completely enclosed by pivoting the fourth side or panel door 10 about pivot point 11 and another hinge or pivot point not herein illustrated. As previously noted in the discussion of FIGURE 1, circuit breaker 13, relay 14 and relay 15 are mounted upon door 10. As in the case of FIGURE 1, a high voltage current is transmitted to contact members 20 and to circuit breaker 13 via contact members 16 and lines 27. A high voltage current is transmitted from circuit breaker 13 to motor 22 via lines 28, lines 29, relay 15, lines 30, relay 14, contact member 17 and contact members 21. A low voltage current is transmitted from circuit breaker 13 via lines 29, relay 15, lines 30 and contact members 19 to contact members 23. Door panel 10 is grounded by means of contact member 18, contact member 24 and ground means 25.

As shown in FIGURE 2, the door or panel 10 is in an open position. In order to effect the relay of electrical current as discussed in the above paragraph, door 10 must be pivoted to a closed position so that friction contact is made between the respective contact members.

The inventive assembly of FIGURE 2 includes an inner door or panel 33. This inner door 33 is held in fixed relationship to outer door 10 by means of spacers 34. Spacers 34 function as a means of spacing door 33 from door 10 and also as a means of supporting door 33. Contact members 16, 17, and 18 are attached directly to inner door 33. Contact members 19 are attached to inner door 33 by means of a holding bracket 35. It is within the scope of this invention to eliminate inner door 33, attaching contact members 16, 17, 18, and 19 directly to door 10.

Doors 10 and 33 can be removed from casing 32 by grasping handle 12 and pivoting said doors 33 and 10 to an open position as shown, and lifting doors 10 and 33 upwards so as to remove the doors from the pivot means 11.

As will be evident to those skilled in the art, various modifications of this invention can be made, or followed, in the light of the foregoing disclosure and discussion without departing from the spirit and scope thereof.

I claim:

1. Apparatus comprising, in combination, a movable support member, a first electrical relay mechanism mounted upon said movable support member, a plurality of first friction electrical contact members operably connected to said first relay mechanism and mounted upon said support member, a plurality of fixed first complementary electrical contact members, said fixed first complementary contact members positioned so that said first contact members and said first complementary contact members are operably engaged when said support member is in a closed position, means of passing an electrical current to said first complementary contact members and thence to said first relay mechanism, means of passing an electrical current from said first relay mechanism to at least a second relay mechanism, a plurality of second friction electrical contact members mounted upon said support member and operably connected to said first relay mechanism, a plurality of fixed second complementary contact members, said fixed second complementary contact members positioned so that said second contact members and said second complementary contact members are operably engaged when said supporting member is in a closed position, means of moving said support member to an open position to include a handle member attached to said support member, said means of moving said support member comprised in part of a means of breaking contact between said first contact members and said first complementary contact members prior to breaking contact between said second contact member and said second complementary contact members, means of interrupting the flow of electrical current from said first relay mechanism immediately prior to moving said support member from said closed position, said means of interrupting including a switch operably connected to said handle member, said switch means positioned in the open position by said handle member immediately prior to moving said support member from said closed position, means of grounding said support member, said ground means operably connected immediately prior to moving said support member into said closed position, said ground means operably disconnected after said support member has been moved from said closed position to said open position, and means of removing said support member when in said open position.

2. Apparatus comprising, in combination, a movable support member, a first electrical relay mechanism mounted upon said movable support member, a plurality of first friction electrical contact members operably connected to said first relay mechanism and mounted upon said support member, a plurality of fixed first complementary electrical contact members, said fixed first complementary contact members positioned so that said first contact members and said first complementary contact members are operably engaged when said support member is in a closed position, means of passing an electrical current to said first complementary contact members and thence to said first relay mechanism, means of passing an electrical current from said first relay mechanism to at least a second relay mechanism, a plurality of second friction electrical contact members mounted upon said support member and operably connected to said first relay mechanism, a plurality of fixed second complementary contact members, said fixed second complementary contact members positioned so that said second contact members and said second complementary contact members are operably engaged when said supporting member is in a closed position, means of moving said support member to an open position to include a handle member attached to said support member, said means of moving said support member comprised in part of a means of breaking contact between said first contact members and said first complementary contact members prior to breaking contact between said second contact member and said second complementary contact members, and means of interrupting the flow of electrical current from said first relay mechanism immediately prior to moving said support member from said closed position, said means of interrupting including a switch operably connected to said handle member, said switch means positioned in the open position by said handle member immediately prior to moving said support member from said closed position.

References Cited by the Examiner
UNITED STATES PATENTS

| | | | |
|---|---|---|---|
| 1,211,752 | 1/17 | Pieper | 317—99 |
| 1,853,428 | 4/32 | Jackson | 317—99 |
| 2,439,326 | 4/48 | Wilson | 317—99 |
| 2,579,992 | 12/51 | Wood | 317—103 |
| 2,645,743 | 7/53 | De Smidt | 317—120 |
| 2,735,042 | 2/56 | Hayford et al. | 317—103 |
| 2,806,098 | 9/57 | Portman et al. | 317—103 |
| 3,012,172 | 12/61 | Kammer et al. | 317—101 |

JOHN F. BURNS, *Primary Examiner.*

E. JAMES SAX, *Examiner.*